United States Patent
Liu

(10) Patent No.: US 11,382,055 B2
(45) Date of Patent: Jul. 5, 2022

(54) PAGING SYNCHRONIZATION METHOD AND APPARATUS

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/049,840

(22) PCT Filed: May 11, 2018

(86) PCT No.: PCT/CN2018/086592
§ 371 (c)(1),
(2) Date: Oct. 22, 2020

(87) PCT Pub. No.: WO2019/213962
PCT Pub. Date: Oct. 14, 2019

(65) Prior Publication Data
US 2021/0243704 A1 Aug. 5, 2021

(51) Int. Cl.
*H04W 56/00* (2009.01)
*H04W 64/00* (2009.01)
*H04W 68/00* (2009.01)

(52) U.S. Cl.
CPC ....... *H04W 56/001* (2013.01); *H04W 64/003* (2013.01); *H04W 68/005* (2013.01)

(58) Field of Classification Search
CPC ............. H04W 56/001; H04W 64/003; H04W 68/005

(Continued)

(56) References Cited

U.S. PATENT DOCUMENTS

| 9,295,058 B2 * | 3/2016 | Kim | H04L 27/2613 |
| 2005/0170846 A1 * | 8/2005 | Jeon | H04W 64/00 |
| | | | 455/456.1 |

(Continued)

FOREIGN PATENT DOCUMENTS

| CN | 102036381 A | 4/2011 |
| CN | 103813419 A | 5/2014 |

(Continued)

OTHER PUBLICATIONS

State Intellectual Property Office of the People's Republic of China, Office Action and Search Report Issued in Application No. 201880000630.5, dated Nov. 13, 2020, 17 pages,.

(Continued)

*Primary Examiner* — Nghi H Ly
(74) *Attorney, Agent, or Firm* — Finnegan, Henderson, Farabow, Garrett & Dunner, L.L.P.

(57) ABSTRACT

The present disclosure provides a paging synchronization method, applied to a base station, and including: when it is determined that transmission of a synchronous signal block (SSB) for synchronization of a terminal is disabled, configuring a reference signal for paging synchronization for a paging occasion (PO) to be transmitted to the terminal; and transmitting the reference signal to the terminal, to enable the terminal to perform paging synchronization based on the reference signal. Therefore, the present disclosure can ensure that the terminal has a higher paging reception performance, and improve the paging synchronization efficiency.

15 Claims, 10 Drawing Sheets

(58) Field of Classification Search
USPC .............. 370/329, 328, 338, 341, 345, 350
See application file for complete search history.

(56) References Cited

U.S. PATENT DOCUMENTS

| | | | |
|---|---|---|---|
| 2013/0244660 A1 | 9/2013 | Kumar et al. | |
| 2013/0288686 A1 | 10/2013 | Chou | |
| 2013/0294423 A1 | 11/2013 | Wang et al. | |
| 2014/0036669 A1 | 2/2014 | Yang et al. | |
| 2014/0050086 A1 | 2/2014 | Himayat et al. | |
| 2014/0080496 A1 | 3/2014 | Terry | |
| 2014/0101726 A1 | 4/2014 | Gupta et al. | |
| 2014/0348115 A1 | 11/2014 | Wang et al. | |
| 2015/0139079 A1 | 5/2015 | Zhu et al. | |
| 2015/0208274 A1 | 7/2015 | Himayat et al. | |
| 2018/0027522 A1 | 1/2018 | Lee et al. | |
| 2018/0262943 A1 | 9/2018 | Gupta et al. | |
| 2021/0127355 A1* | 4/2021 | Gonzalez | H04W 68/02 |

FOREIGN PATENT DOCUMENTS

| | | |
|---|---|---|
| CN | 104219764 A | 12/2014 |
| CN | 105409307 A | 3/2016 |
| CN | 106572533 A | 4/2017 |
| CN | 107733624 A | 2/2018 |
| CN | 107734642 A | 2/2018 |
| CN | 108702721 A | 10/2018 |
| WO | WO 2015/154296 A1 | 10/2015 |
| WO | WO 2019/143937 A1 | 7/2019 |

OTHER PUBLICATIONS

ISA State Intellectual Property Office of the People's Republic of China, Written Opinion of the International Searching Authority Issued in Application No. PCT/CN2018/086592, dated Feb. 20, 2019, WIPO, 9 pages.
European Patent Office, Extended European Search Report Issued in Application No. 18918210.8, dated Apr. 26, 2021, 9 pages.
Ericsson, "Synchronization using non-cell-defining signals",3GPP TSG RAN WG1 Meeting #91, Reno, Nevada, US, R1-1720944 (revised from R1-1717761), Dec. 27-1, 2017, 11 pages.
Ericsson, "Additional synchronization provision",3GPP TSG RAN WG1 Meeting #90bis, Prague, Czech Republic, R1-1717761 (revised from R1-1716158), Oct. 9-13, 2017, 12 pages.
State Intellectual Property Office of the People's Republic of China, Office Action and Search Report Issued in Application No. 2018800006305, dated May 28, 2020, 20 pages.
ISA State Intellectual Property Office of the People's Republic of China, International Search Report Issued in Application No. PCT/CN2018/086592, dated Feb. 20, 2019, WIPO, 8 pages.
Xiaomi Technology, "Consideration on NR paging design", 3GPP TSG RAN WG1 Meeting NR#3, Nagoya, Japan, R1-1716456, Sep. 18-21, 2017, 4 pages.
Office Action dated Dec. 23, 2021, from the Intellectual Property India issued in counterpart Indian Application No. 202047052728.

* cited by examiner

PAGING SYNCHRONIZATION METHOD AND APPARATUS

CROSS REFERENCE TO RELATED APPLICATIONS

This application is a national phase application based on International Application No. PCT/CN2018/086592, filed May 11, 2018, the content of which is incorporated herein by reference.

TECHNICAL FIELD

The present disclosure relates to the field of communication, and in particular, to a paging synchronization method and apparatus.

BACKGROUND

In the new generation of communication technology, especially in the design of unauthorized spectrum, it is required to consider a variety of relevant regulations. For example, LBT (listen before talk) mechanism demands a base station to detect channel energy before transmitting signals, and if the detection result shows existence of interference, it is necessary for the base station to wait. Moreover, in the scenario of independent networking of unauthorized spectrum cells, the paging synchronization of a terminal mainly depends on SSBs (synchronous signal blocks) sent by a base station. If the base station can send SSBs, the terminal can perform the synchronization according to the SSBs sent by the base station, and then receive the paging, so the receiving success rate is relatively high. However, if the base station cannot send SSBs, the terminal will receive the paging without synchronization in the paging receiving process, and the failure probability is high, resulting in the degradation of paging reception performance.

SUMMARY

In order to overcome the problems existing in the related art, examples of the present disclosure provide a paging synchronization method and device.

According to a first aspect of examples of the present disclosure, there is provided a paging synchronization method, applied to a base station and comprising:

when it is determined that transmission of a synchronous signal block (SSB) for synchronization of a terminal is disabled, configuring a reference signal for paging synchronization for a paging occasion (PO) to be transmitted to the terminal;

transmitting the reference signal to the terminal, to enable the terminal to perform paging synchronization based on the reference signal.

In an example, the method further comprises:

determining one or more first transmission positions for transmitting an SSB in an SSB transmission cycle;

when it is determined that each of the first transmission positions does not meet an SSB transmission condition, determining that the transmission of the SSB for synchronization of the terminal is disabled.

In an example, the method further comprises:

when it is determined that at least one of the first transmission positions meets the SSB transmission condition, transmitting the SSB for synchronization of the terminal at the first transmission position which meets the SSB transmission condition.

In an example, the SSB transmission condition comprises: detecting that a channel is not occupied before the SSB is transmitted.

In an example, the reference signal is a pseudo-random sequence.

In an example, the transmitting the reference signal to the terminal, comprising:

determining a pre-designated position for transmitting the reference signal in the SSB transmission cycle;

transmitting the reference signal to the terminal at the pre-designated position, to enable the terminal to receive the reference signal at the pre-designated position.

In an example, the method further comprises:

generating a paging synchronization signaling which comprises position information for indicating the pre-designated position;

transmitting the paging synchronization signaling comprising the position information to the terminal, to enable the terminal to determine the pre-designated position based on the position information in the paging synchronization signaling.

In an example, the pre-designated position is located before a second transmission position for transmitting the PO to be transmitted to the terminal, or located within a designated range of the second transmission position.

According to a second aspect of examples of the present disclosure, there is provided a paging synchronization method, applied to a terminal and comprising:

when it is determined that a synchronous signal block (SSB) for synchronization of the terminal has not been received, receiving a reference signal for paging synchronization which is configured by a base station for a paging occasion (PO) to be transmitted to the terminal;

performing paging synchronization according to the reference signal.

In an example, the method further comprises:

determining one or more first reception positions for receiving an SSB in an SSB transmission cycle;

if no SSB has been received at each of the first reception positions, determining that no SSB for synchronization of the terminal is received.

In an example, the method further comprises:

if an SSB is received at at least one of the first reception positions, performing paging synchronization according to the received SSB.

In an example, the reference signal is a pseudo-random sequence.

In an example, receiving the reference signal for paging synchronization which is configured by the base station for the PO to be transmitted, comprising:

determining a pre-designated position for receiving the reference signal in the SSB transmission cycle;

receiving the reference signal at the pre-designated position.

In an example, determining the pre-designated position for receiving the reference signal in the SSB transmission cycle, comprising:

receiving a paging synchronization signaling transmitted by the base station, wherein, the paging synchronization signaling comprises position information for indicating the pre-designated position;

determining the pre-designated position based on the position information in the paging synchronization signaling.

In an example, the pre-designated position is located before a second reception position for receiving the PO to be transmitted to the terminal, or located within a designated range of the second reception position.

According to a third aspect of examples of the present disclosure, there is provided a non-transitory computer-readable storage medium storing a computer program, wherein, the computer program is configured to perform a paging synchronization method according to the above first aspect.

According to a fourth aspect of examples of the present disclosure, there is provided a non-transitory computer-readable storage medium storing a computer program, wherein, the computer program is configured to perform a paging synchronization method according to the above second aspect.

According to a fifth aspect of examples of the present disclosure, there is provided a paging synchronization device, applied to a base station, and comprising:
a processor;
a memory storing processor-executable instructions;
wherein, the processor is configured to perform a paging synchronization method according to the above first aspect.

According to a sixth aspect of examples of the present disclosure, there is provided a paging synchronization device, applied to a terminal UE, and comprising:
a processor;
a memory storing processor-executable instructions;
wherein, the processor is configured to perform a paging synchronization method according to the above second aspect.

The technical solutions provided by the examples of the present disclosure may include the following beneficial effects.

In the present disclosure, during the paging transmission process, generally, a base station first sends an SSB for synchronization of a terminal, and then sends a PO. However, when determining that the transmission of the SSB for synchronization of the terminal is disabled, the base station may configure a reference signal for paging synchronization for the PO to be transmitted, and send the reference signal for paging synchronization to the terminal. Thus, when having not received any SSB for synchronization of the terminal, the terminal may perform paging synchronization based on the reference signal for paging synchronization, and then receive the PO, so as to ensure a higher paging reception performance and improve the efficiency of the paging synchronization.

In the present disclosure, during the paging reception process, generally, a terminal first receives an SSB for synchronization of a terminal, and then receives a PO after the synchronization is completed based on the SSB. However, when determining that no SSB for synchronization of the terminal is received, the terminal may receive a reference signal for paging synchronization configured by a base station for the PO to be transmitted, and perform paging synchronization based on the reference signal for paging synchronization. Thus, the paging reception performance degradation due to having not received an SSB for synchronization can be avoided, and the paging synchronization efficiency can be improved.

It should be understood that the above general description and the following detailed description are only exemplary and explanatory and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Figure 1:
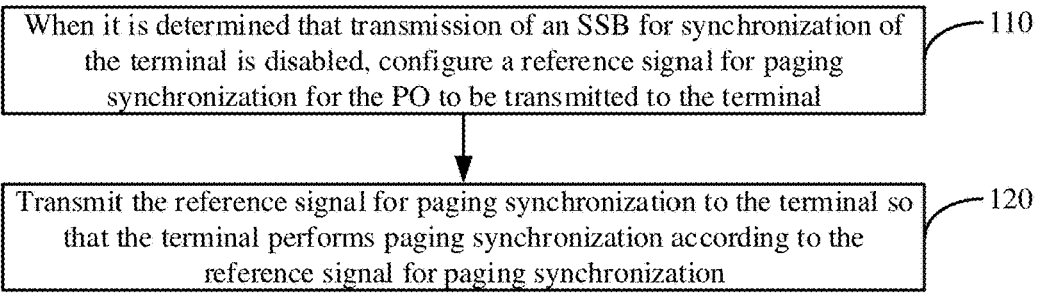
FIG. 1 is a flow chart illustrating a paging synchronization method according to an example.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein refers to and includes any and all possible combinations of one or more of the associated listed items.

It is to be understood that, although terms "first," "second," "third," and the like may be used in the present disclosure to describe various information, such information should not be limited to these terms. These terms are only used to distinguish one category of information from another. For example, without departing from the scope of the present disclosure, indication information may be referred as second information; and similarly, second information may also be referred as indication information. Depending on the context, the word "if" as used herein may be interpreted as "when" or "upon" or "in response to determining".

Figure 2:
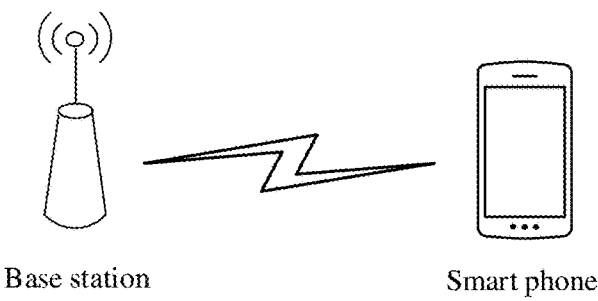
FIG. 2 is a diagram illustrating an application scenario to which a paging synchronization method is applied according to an example.

FIG. 1 is a flow chart illustrating a paging synchronization method according to an example, and FIG. 2 is a schematic diagram illustrating an application scenario to which the paging synchronization method is applied according to an example; the paging synchronization method is applied to a base station. As shown in FIG. 1, the paging synchronization method may include the following steps 110 to 120.

In step 110, when it is determined that transmission of an SSB for synchronization of the terminal is disabled, a reference signal for paging synchronization is configured for the PO (Paging Occasion) to be transmitted to the terminal.

In examples of the present disclosure, in the paging transmission process, the base station generally sends an SSB used for synchronization of the terminal, and then sends the PO (that is, the paging message is sent in the PO). However, when it is determined that the transmission of an SSB for synchronization of the terminal is disabled, the reference signal for paging synchronization can also be configured for the PO to be transmitted, and the reference signal for paging synchronization can be sent to the terminal. In this way, when having not received an SSB used for synchronization of the terminal, the terminal can also perform paging synchronization according to the reference signal used for paging synchronization before receiving the PO. In this way, it ensures that the terminal has a relatively high paging reception performance, and improves the paging synchronization efficiency.

The reason that the base station can send an SSB used for synchronization of the terminal is: according to the LBT mechanism, the base station is required to first detect channel energy before sending any SSB; if the detection result indicates existence of interference, the base station gives up sending an SSB, which results in that the terminals within the coverage of the base station cannot receive any SSB for synchronization. That is to say, before sending an SSB, if the base station detects that the channel is not occupied, the transmission of an SSB is allowed; if it detects that the channel has been occupied, the transmission of an SSB is not allowed.

When it is determined that the transmission of an SSB for synchronization of the terminal is disabled, the base station also needs to provide a reference signal for paging synchronization to the terminal, in order not to reduce the paging reception performance of the terminal.

In an example, the reference signal in step 110 above may be a pseudo-random sequence, for example, a pseudo-random sequence generated by the base station according to a certain rule.

In step 120, the reference signal for paging synchronization is transmitted to the terminal so that the terminal performs paging synchronization according to the reference signal for paging synchronization.

The exemplary scenario shown in FIG. 2 includes a base station and a smart phone as UE. When the base station determines that it cannot send any SSB for synchronization of the terminal, it will configure a reference signal for paging synchronization for PO to be sent to the terminal, and send the reference signal for paging synchronization to the terminal. Then, when determining having not received an SSB for synchronization of the terminal, the terminal can receive the reference signal configured by the base station and perform paging synchronization according to the reference signal.

It can be seen from the above example that when it is determined that the transmission of an SSB for synchronization of the terminal is disabled, the reference signal for paging synchronization can be configured for the PO to be sent to the terminal, and can be sent to the terminal. In this way, when the terminal has not received any SSB for synchronization after wake-up, it can also perform paging synchronization based on the reference signal, which ensures that the terminal has a relatively high paging reception performance, and improves the paging synchronization efficiency.

Figure 3A:
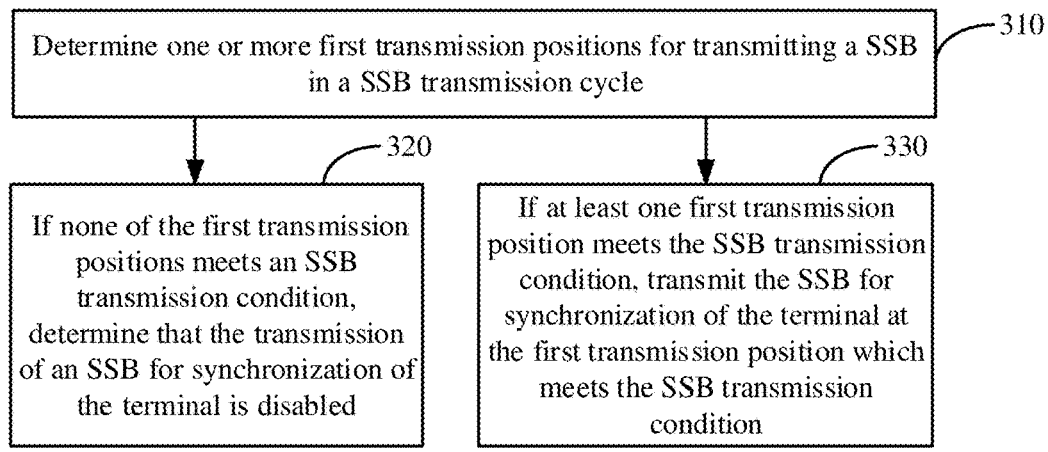
FIG. 3A is a flow chart illustrating another paging synchronization method according to an example.

FIG. 3A is a flow chart illustrating another paging synchronization method according to an example. The paging synchronization method is applied to a base station, and is established based on the method steps shown in FIG. 1. The paging synchronization method may include the following steps 310 to 320, as shown in FIG. 3A.

In step 310, one or more first transmission positions for transmitting an SSB in an SSB transmission cycle are determined.

Figure 3B:
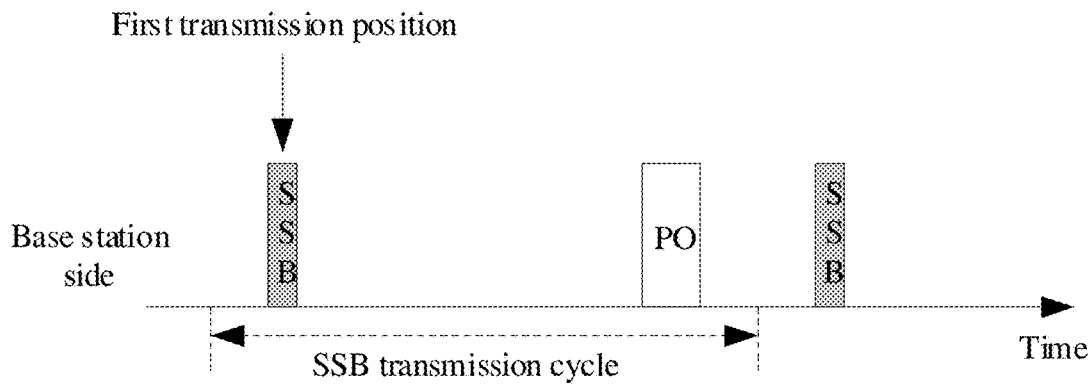
FIG. 3B is a schematic diagram illustrating an SSB transmission position according to an example.
Figure 3C:
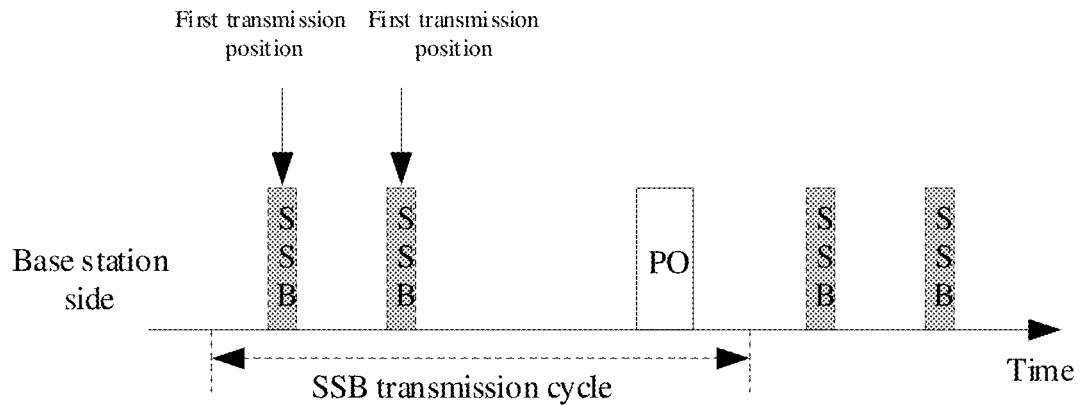
FIG. 3C is a schematic diagram illustrating another SSB transmission position according to an example.

In an example of the present disclosure, for an SSB transmission cycle, there may be an SSB transmission position (location), such as first transmission position as shown in FIG. 3B, or multiple SSB transmission positions, such as each first transmission position as shown in FIG. 3C, which is configured by the base station according to the actual situation. The length of an SSB transmission cycle can be 20 ms.

In an example, in the above-mentioned step 310, the process of determining one or more first transmission positions for transmitting an SSB in an SSB transmission cycle, may include, but is not limited to, the following manners.

(1-1) If one SSB transmission position is configured in the SSB transmission cycle, the SSB transmission position is determined as the first transmission position, as shown in FIG. 3B.

In an example of the present disclosure, the SSB transmission position may be the only transmission position configured for the SSB transmission cycle by the base station. If the base station cannot send a SBB at the only transmission position, it needs to configure a reference signal for paging synchronization for the terminal.

In addition, the duration of an SSB cycle can be 20 ms.

(1-2) If multiple SSB transmission positions are configured in the SSB transmission cycle, each of the SSB transmission positions may be determined as the first transmission position, as shown in FIG. 3C.

In an example of the present disclosure, among the multiple SSB transmission positions, there may be a commonly-used transmission position configured by the base station, and the rest are alternative transmission positions. Only when the base station cannot send an SSB at any of all the transmission positions, the base station needs to configure a reference signal for paging synchronization for the terminal.

In step 320, if none of the first transmission positions meets an SSB transmission condition, it is determined that the transmission of an SSB for synchronization of the terminal is disabled.

In an example of the present disclosure, no matter how many first transmission positions are configured by the base station, the base station finally determines that the transmission of an SSB for paging synchronization is disabled only when no first transmission position can be used to send the SSB. At this time, the base station needs to configure a reference signal for paging synchronization for the terminal.

In an example, the SSB transmission condition in the above step 320 may include detecting that the channel is not occupied before sending the SSB.

In an example, as shown in FIG. 3A, the method may further include the following step 330 after step 310 is performed.

In step 330, if it is determined that at least one first transmission position meets the SSB transmission condition, the SSB for synchronization of the terminal may be transmitted at the first transmission position which meets the SSB transmission condition.

In an example of the present disclosure, if there is only one first transmission position which meets the SSB transmission condition, an SSB for synchronization of the terminal can be transmitted at the first transmission position.

If there are a plurality of first transmission positions which meet the SSB transmission condition, one of the plurality of first transmission positions can be selected to transmit the SSB for synchronization of the terminal.

From the above examples, after one or more first transmission positions for SSB transmission in the SSB transmission cycle are determined, it is determined that an SSB for synchronization of the terminal cannot be sent only when each first transmission position does not meet the SSB transmission condition. At this time, a reference signal for paging synchronization may be configured for the PO to be transmitted. In this way, the accuracy of configuring the reference signal may be improved.

Figure 4A:
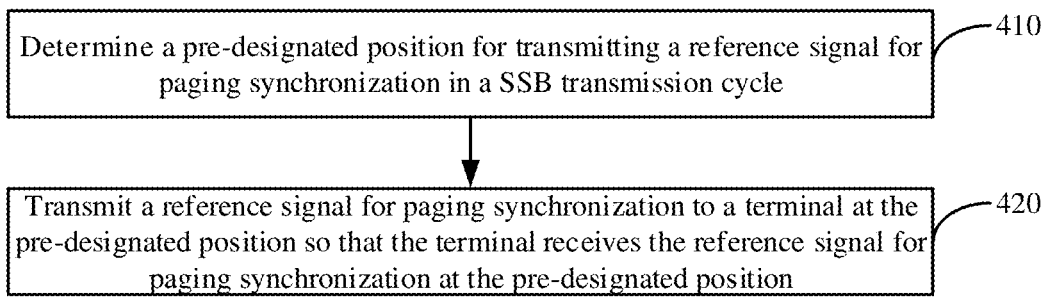
FIG. 4A is a flow chart illustrating another paging synchronization method according to an example.

FIG. 4A is a flow chart illustrating another paging synchronization method according to an example. The paging synchronization method is applied to a base station, and is established based on the method steps shown in FIG. 1. When step 120 is performed, as shown in FIG. 4A, the method may further include the following steps 410 to 420.

In step 410, a pre-designated position for transmitting a reference signal for paging synchronization in an SSB transmission cycle is determined.

Figure 5:
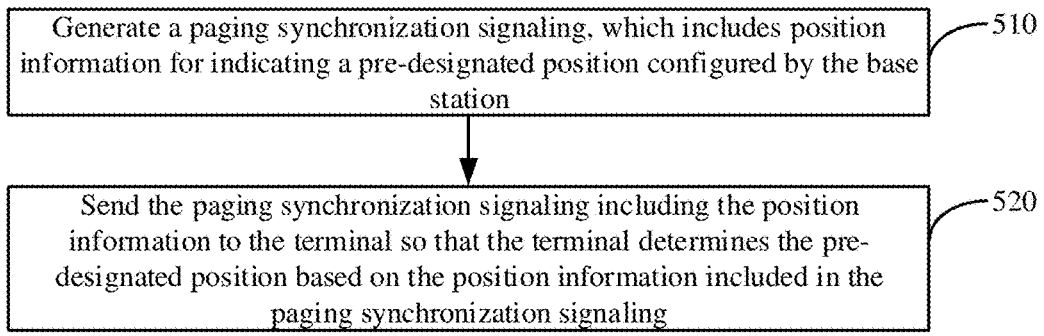
FIG. 5 is a flow chart illustrating another paging synchronization method according to an example.

In an example of the present disclosure, the pre-designated position can be previously configured by the base station and agreed by the terminal in advance; it can also be dynamically configured by the base station and notified to the terminal through a paging synchronization signaling, which is detailed in the example depicted based on FIG. 5.

Figure 4B:
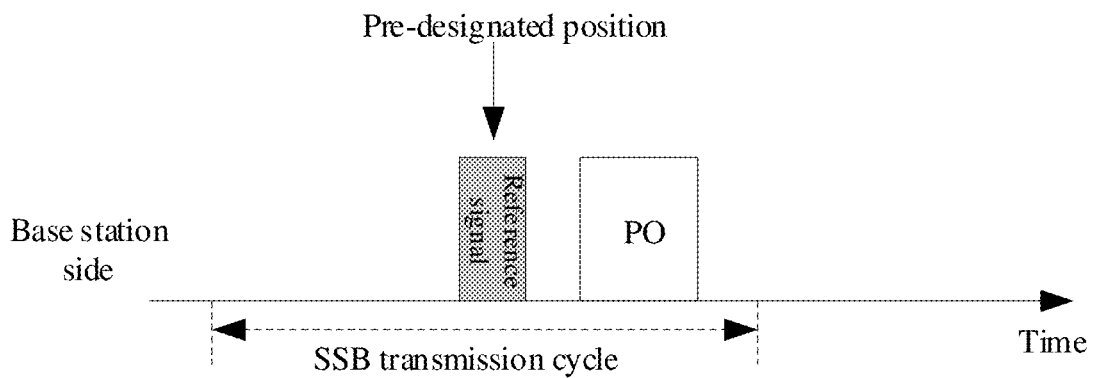
FIG. 4B is a schematic diagram illustrating a pre-designated position according to an example.
Figure 4C:
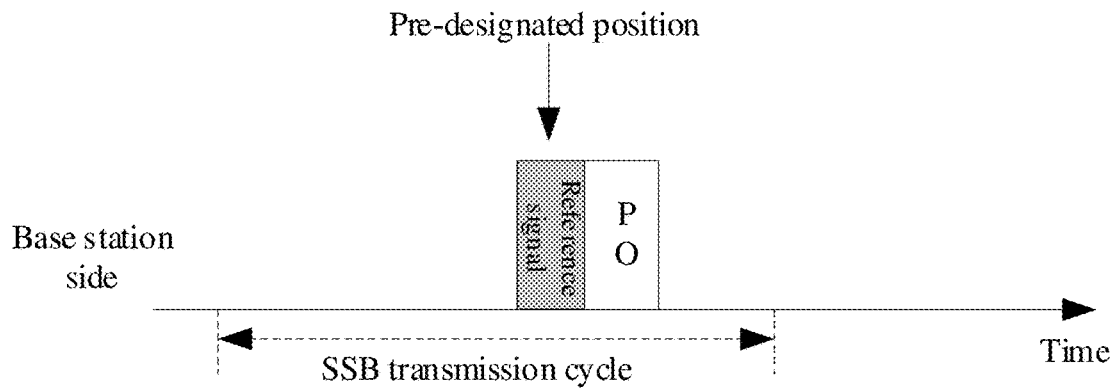
FIG. 4C is a schematic diagram illustrating another pre-designated position according to an example.

In an example, the pre-designated position in the above step 410 may be located before a second transmission position at which the PO is to be transmitted to the terminal, as shown in FIG. 4B. The pre-designated position may also be within a designated range associated with the second transmission position, for example, the first few symbols of the PO may be used as the reference signal, as shown in FIG. 4C.

In step 420, a reference signal for paging synchronization is transmitted to a terminal at the pre-designated position so that the terminal receives the reference signal for paging synchronization at the pre-designated position.

From the above examples, a pre-designated position for transmitting a reference signal for paging synchronization can be determined first, and then, the reference signal for paging synchronization can be transmitted to the terminal at the pre-designated position. Thus, the terminal can receive the reference signal for paging synchronization at the pre-designated position, thereby improving the accuracy of reference signal reception.

FIG. 5 is a flow chart illustrating another paging synchronization method according to an example. The paging synchronization method is applied to a base station and is established based on the method steps shown in FIG. 4A. The paging synchronization method may include the following steps 510 to 520.

In step 510, a paging synchronization signaling is generated, which includes position information for indicating a pre-designated position configured by the base station.

In step 520, the paging synchronization signaling including the position information is sent to the terminal so that the terminal determines the pre-designated position based on the position information included in the paging synchronization signaling.

From the above example, a paging synchronization signaling which includes a pre-designated position configured by a base station can be generated, and sent to a terminal. The terminal may determine the pre-designated position based on the paging synchronization signaling. In this way, dynamic configuration of the pre-designated position can be achieved, and the flexibility of paging synchronization can be improved.

Figure 6:
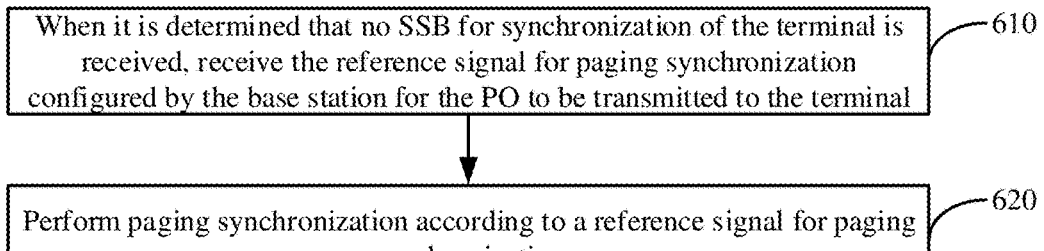
FIG. 6 is a flow chart illustrating a paging synchronization method according to an example.

FIG. 6 is a flow chart illustrating a paging synchronization method according to an example. The paging synchronization method is applied to a terminal. As shown in FIG. 6, the paging synchronization method can include the following steps 610 to 620.

In step 610, when it is determined that no SSB for synchronization of the terminal is received, the reference signal for paging synchronization configured by the base station for the PO to be transmitted to the terminal is received.

In an example of the present disclosure, during the paging reception process, an SSB for terminal synchronization is generally received first, and the synchronization is performed according to the SSB, then the PO is received (i.e., the paging message is received in the PO). However, when it is determined that no SSB is received for synchronization of the terminal, the reference signal for paging synchronization configured by the base station for the PO to be transmitted can also be received, and the paging synchronization can be performed according to the reference signal used for paging synchronization. In this way, the degradation of paging reception performance caused by having not received an SSB for synchronization can be avoided, so as to ensure a higher paging reception performance of the terminal and improve the efficiency of paging synchronization.

The reason why the terminal has not received an SSB for synchronization of the terminal is: according to the LBT mechanism, the base station must first detect the channel energy before sending any SSB, and if there is interference, it needs to give up sending an SSB. Therefore, the terminals within the coverage of the base station may not receive any SSB for synchronization of the terminal.

After it is determined that no SSB for synchronization is received by the terminal, in order not to reduce the paging reception performance, the terminal also needs to receive the reference signal configured by the base station for paging synchronization.

In an example, the reference signal in step 610 above may be a pseudo-random sequence, for example, a pseudo-random sequence generated by the base station according to a certain rule.

In step 620, paging synchronization is performed according to a reference signal for paging synchronization.

From the above example, when it is determined that no SSB is received for synchronization of the terminal, the reference signal for paging synchronization configured by the base station for the PO to be transmitted to the terminal can be received, and the paging synchronization can be performed according to the reference signal used for paging synchronization. In this way, a higher paging reception performance of the terminal can be ensured, and the efficiency of paging synchronization can be improved.

Figure 7A:
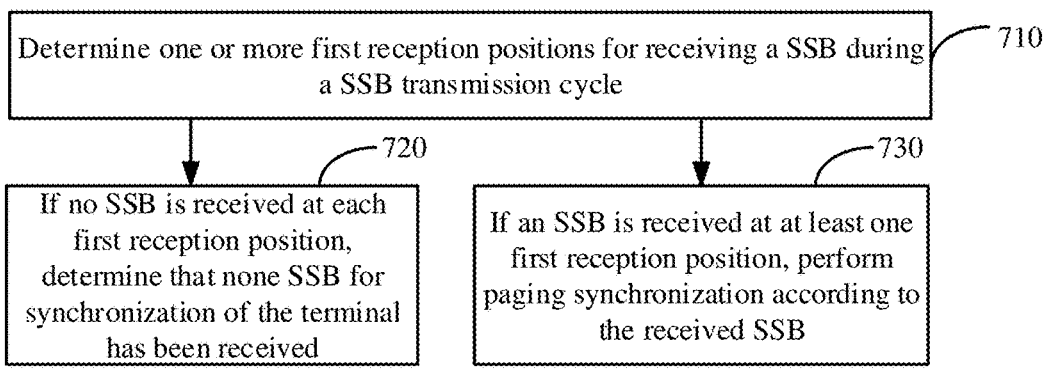
FIG. 7A is a flow chart illustrating another paging synchronization method according to an example.

FIG. 7A is a flow chart illustrating another paging synchronization method according to an example. The paging synchronization method is applied to a terminal and is established based on the method steps shown in FIG. 6. As shown in FIG. 7A, the paging synchronization method may include the following steps 710 to 720.

In step 710, one or more first reception positions for receiving an SSB during an SSB transmission cycle are determined.

Figure 7B:
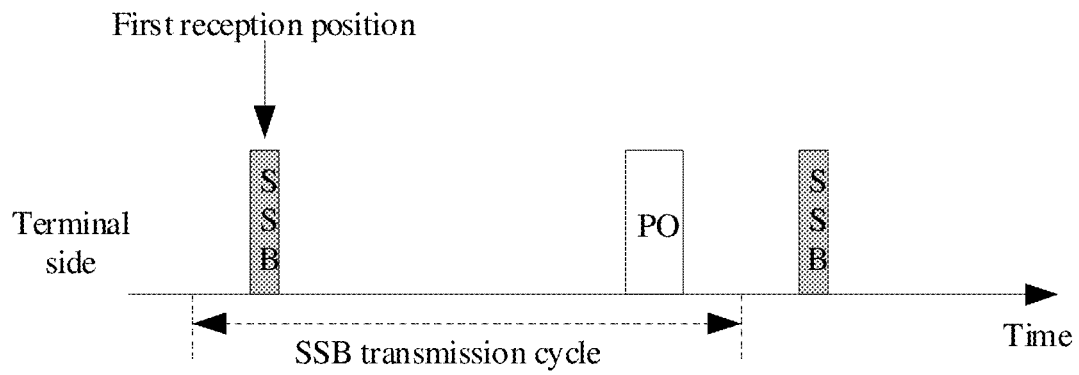
FIG. 7B is a schematic diagram illustrating an SSB reception position according to an example.
Figure 7C:
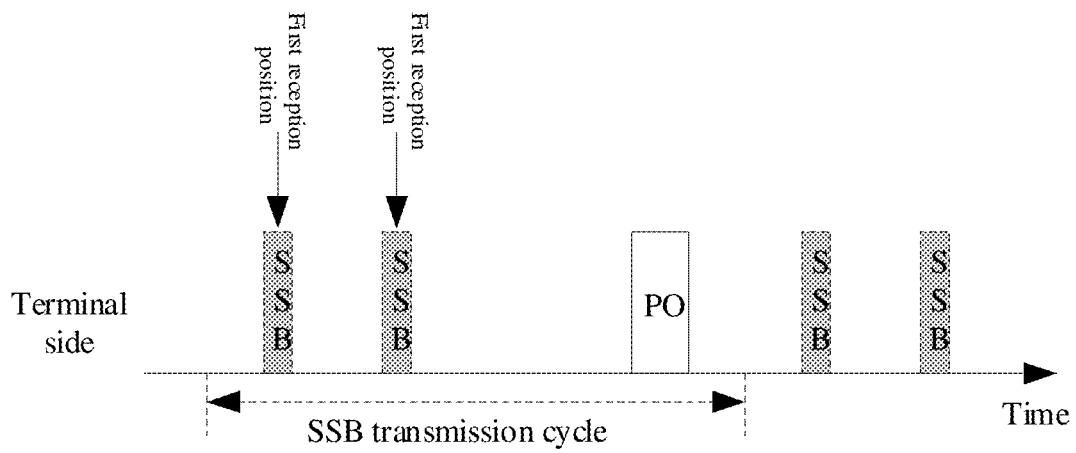
FIG. 7C is a schematic diagram illustrating another SSB reception position according to an example.

In an example of the present disclosure, there may be one SSB reception position, such as the first reception position shown in FIG. 7B, or multiple SSB reception positions, such as the first reception positions as shown in FIG. 7C. This is determined by the terminal according to the configurations of the base station.

In an example, in the above-mentioned step 710, the process of determining one or more first reception positions for receiving an SSB in an SSB transmission cycle, may include, but is not limited to, the following sub-blocks.

(2-1) If one SSB position is configured in the SSB transmission cycle, the SSB position is determined as the first reception position, as shown in FIG. 7B.

In an example of the present disclosure, the SSB position may be the only reception position determined by the terminal according to the configurations of the base station. If the terminal cannot receive a SBB at the only reception position, it needs to receive a reference signal for paging synchronization configured by the base station at a pre-designated position.

(2-2) If multiple SSB positions are configured in the SSB transmission cycle, each of the SSB positions may be determined as the first reception position, as shown in FIG. 7C.

In an example of the present disclosure, among the multiple SSB positions, there may be a commonly-used reception position determined by the terminal according to the configurations of the base station, and the rest are alternative reception positions. Only when the terminal cannot receive an SSB at any of all the reception positions, the terminal needs to receive a reference signal for paging synchronization configured by the base station at a pre-designated position.

In step 720, if no SSB is received at each first reception position, it is determined that no SSB for synchronization of the terminal has been received.

In an example of the present disclosure, no matter how many first transmission positions are configured by the base station, the terminal finally determines that no SSB for synchronization of the terminal has been received only when no SSB for synchronization of the terminal has been received at any one of all the first reception positions. At this time, the terminal needs to receive a reference signal for paging synchronization configured by the base station.

In an example, as shown in FIG. 7A, the method may further include the following step 730 after step 710 is performed.

In step 730, if an SSB is received at at least one first reception position, paging synchronization is performed according to the received SSB.

In an example of the present disclosure, regardless of at which first reception position an SSB is received, the received SSB may be used to perform the paging synchronization.

From the above example, after one or more first reception positions for receiving SSBs are determined, only when no SSB is received at each first reception position, it is determined that no SSB for synchronization of the terminal is received. At this time, the terminal receives a reference signal for paging synchronization configured by the base station for the PO to be transmitted, and performs paging synchronization according to the reference signal for paging synchronization. In this way, the accuracy of reference signal reception can be improved.

Figure 8A:
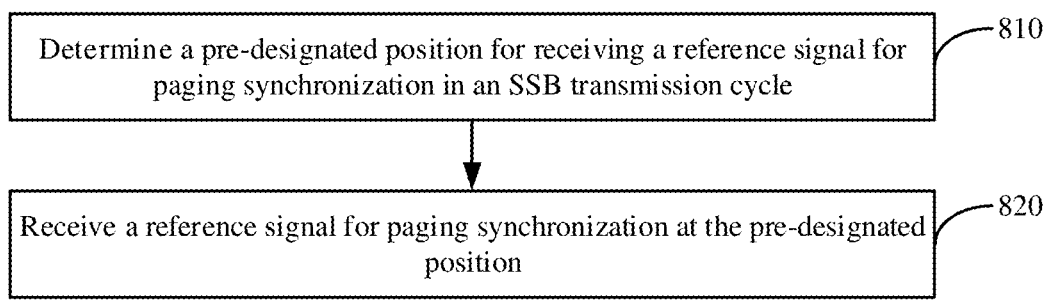
FIG. 8A is a flow chart illustrating another paging synchronization method according to an example.

FIG. 8A is a flow chart illustrating another paging synchronization method according to an example. The paging synchronization method is applied to a terminal, and is established based on the method steps shown in FIG. 6. When receiving the reference signal for paging synchronization configured by the base station for the PO to be transmitted to the terminal in step 610, as shown in FIG. 8A, the method may further include the following steps 810 to 820.

In step 810, a pre-designated position for receiving a reference signal for paging synchronization in an SSB transmission cycle is determined.

Figure 9:
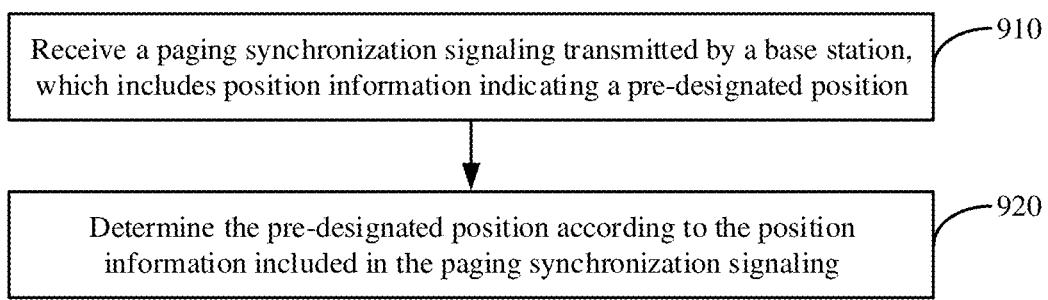
FIG. 9 is a flow chart illustrating another paging synchronization method according to an example.

In an example of the present disclosure, the pre-designated position can be configured previously by the base station and agreed by the terminal in advance; it can also be dynamically configured by the base station and notified to the terminal through a paging synchronization signaling, which is detailed in the example depicted based on FIG. 9.

Figure 8B:
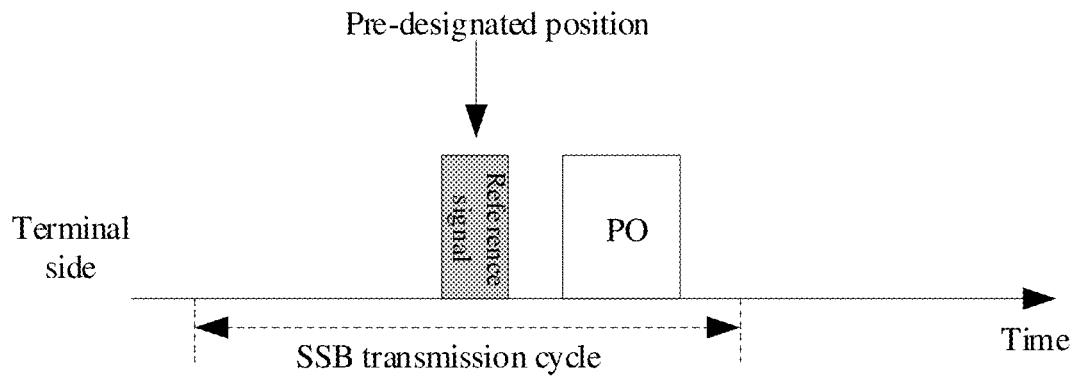
FIG. 8B is a schematic diagram illustrating a pre-designated position according to an example.
Figure 8C:
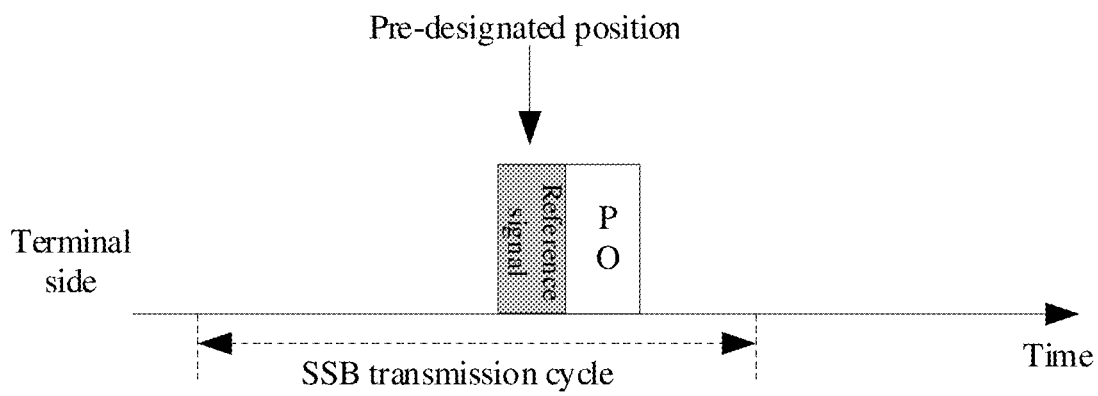
FIG. 8C is a schematic diagram illustrating another pre-designated position according to an example.

In an example, the pre-designated position in the above step 810, such as a pre-designated position shown in FIG. 8B, may be located before a second reception position for receiving the PO to be transmitted to the terminal. The pre-designated position, such as a pre-designated position as shown in FIG. 8C, may also be within a designated range associated with the second reception position.

In step 820, a reference signal for paging synchronization is received at the pre-designated position.

From the above example, a pre-designated position for receiving a reference signal for paging synchronization can be determined first, and the reference signal for paging synchronization is received at the pre-designated position, thereby improving the accuracy of reference signal reception.

FIG. 9 is a flowchart illustrating another paging synchronization method according to an example. The paging synchronization method is applied to a terminal and established based on the method steps shown in FIG. 8A. When performing step 810, the method may include the following steps 910 to 920.

In step 910, a paging synchronization signaling transmitted by a base station is received, which includes position information indicating a pre-designated position.

In step 920, the pre-designated position is determined according to the position information included in the paging synchronization signaling.

From the above example, by receiving a paging synchronization signaling transmitted by the base station, where the paging synchronization signaling includes position information indicating a pre-designated position, and determining the pre-designated position based on the position information in the paging synchronization signaling, dynamic reception of the pre-designated position can be achieved, which improves the flexibility of the paging synchronization.

Corresponding to the aforementioned examples of the paging synchronization method, the present disclosure also provides examples of a paging synchronization device.

Figure 10:
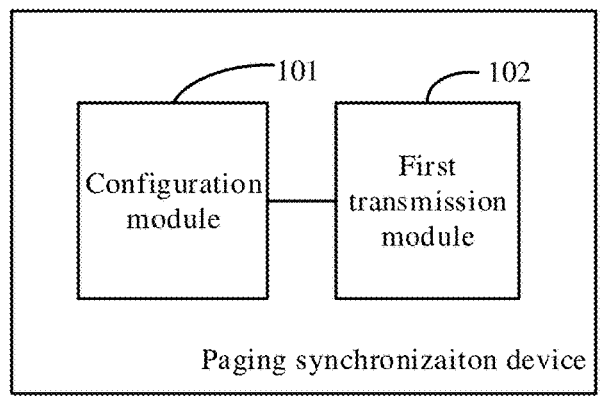
FIG. 10 is a block diagram illustrating a paging synchronization device according to an example.

FIG. 10 is a block diagram illustrating a paging synchronization device according to an example. The paging synchronization device is applied to a base station, and is configured to perform the paging synchronization method shown in FIG. 1. As shown in FIG. 10, the paging synchronization device may include a configuration module 101 and a first transmission module 102.

The configuration module 101 is configured to, when determining that transmission of a synchronous signal block (SSB) for synchronization of a terminal is disabled, configure a reference signal for paging synchronization for a PO to be transmitted to the terminal.

The first transmission module 102 is configured to transmit the reference signal to the terminal, to enable the terminal to perform paging synchronization based on the reference signal.

It can be seen from the above example that when it is determined that the transmission of an SSB for synchronization of the terminal is disabled, the reference signal for paging synchronization can be configured for the PO to be sent to the terminal, and can be sent to the terminal. In this way, when the terminal has not received any SSB for synchronization of the terminal, it can also perform paging synchronization based on the reference signal, which ensures that the terminal has a relatively high paging reception performance, and improves the paging synchronization efficiency.

Figure 11:
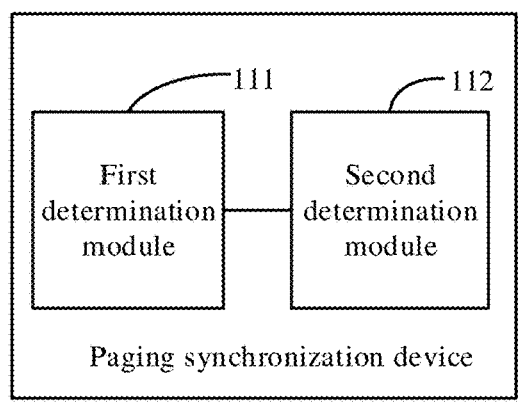
FIG. 11 is a block diagram illustrating another paging synchronization device according to an example.

In an example, on the basis of the device as shown in FIG. 10, the paging synchronization device may include a first determination module 111 and a second determination module 112 as shown in FIG. 11.

The first determination module 111 is configured to determine one or more first transmission positions for transmitting an SSB in an SSB transmission cycle.

The second determination module 112 is configured to, when determining that each of the first transmission positions does not meet an SSB transmission condition, determining that the transmission of the SSB for synchronization of the terminal is disabled.

From the above examples, after one or more first transmission positions for SSB transmission in the SSB transmission cycle are determined, it is determined that transmission of an SSB for synchronization of the terminal is disabled only when each first transmission position does not meet the SSB transmission condition. At this time, a reference signal for paging synchronization may be configured for the PO to be transmitted. In this way, the accuracy of configuring the reference signal may be improved.

Figure 12:
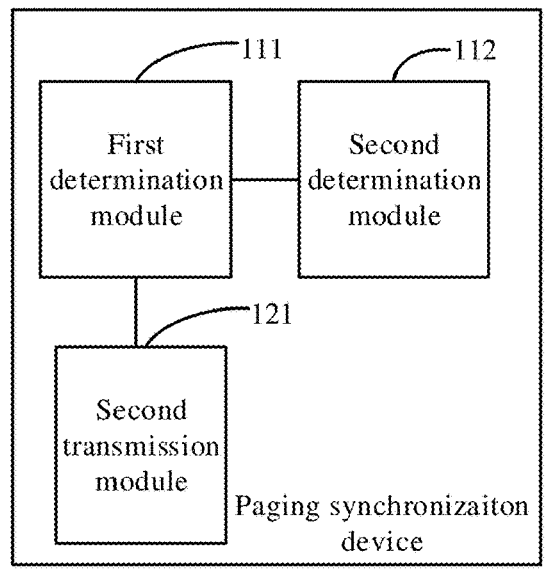
FIG. 12 is a block diagram illustrating another paging synchronization device according to an example.

In an example, on the basis of the device as shown in FIG. 11, the paging synchronization device may include a second transmission module 121 as shown in FIG. 12.

The second transmission module 121 is configured to, when determining that at least one of the first transmission positions meets the SSB transmission condition, transmit the SSB for synchronization of the terminal at the first transmission position which meets the SSB transmission condition.

In an example, based on the device as shown in FIG. 11, the SSB transmission condition may include: detecting that a channel is not occupied before the SSB is transmitted.

In an example, based on the device as shown in FIG. 10, the reference signal is a pseudo-random sequence.

Figure 13:
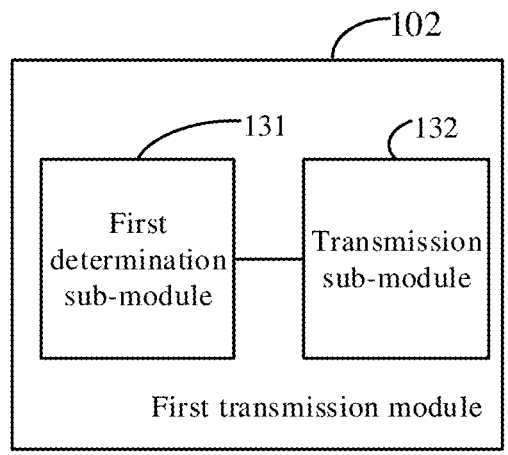
FIG. 13 is a block diagram illustrating another paging synchronization device according to an example.

In an example, on the basis of the device as shown in FIG. 10, the first transmission module 102 may include a first determination sub-module 131 and a transmission sub-module 132 as shown in FIG. 13.

The first determination sub-module 131 is configured to determine a pre-designated position for transmitting the reference signal in the SSB transmission cycle.

The transmission sub-module 132 is configured to transmit the reference signal to the terminal at the pre-designated position, to enable the terminal to receive the reference signal at the pre-designated position.

From the above examples, a pre-designated position for transmitting a reference signal for paging synchronization can be determined first, and then, the reference signal for paging synchronization can be transmitted to the terminal at the pre-designated position. Thus, the terminal can receive the reference signal for paging synchronization at the pre-designated position, thereby improving the accuracy of reference signal reception.

Figure 14:
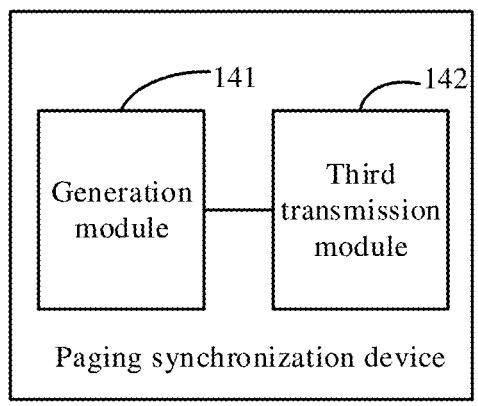
FIG. 14 is a block diagram illustrating another paging synchronization device according to an example.

In an example, on the basis of the device as shown in FIG. 13, the paging synchronization device may include a generation module 141 and a third transmission module 142 as shown in FIG. 14.

The generation module 141 is configured to generate a paging synchronization signaling which comprises position information for indicating the pre-designated position.

The third transmission module 142 is configured to transmit the paging synchronization signaling comprising the position information to the terminal, to enable the terminal to determine the pre-designated position based on the position information in the paging synchronization signaling.

From the above example, a paging synchronization signaling which includes a pre-designated position configured by a base station can be generated, and sent to a terminal. The terminal may determine the pre-designated position based on the paging synchronization signaling. In this way, dynamic configuration of the pre-designated position can be achieved, and the flexibility of paging synchronization can be improved.

In an example, on the basis of the device as shown in FIG. 13 or FIG. 14, for example, referring to FIG. 14, the pre-designated position is located before a second transmission position for transmitting the PO to be transmitted to the terminal, or located within a designated range of the second transmission position.

Figure 15:
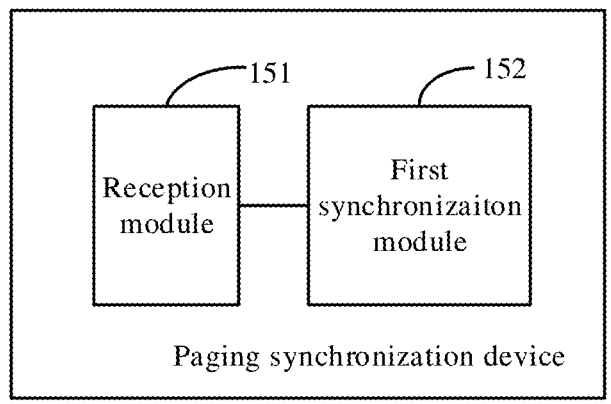
FIG. 15 is a block diagram illustrating a paging synchronization device according to an example.

FIG. 15 is a block diagram illustrating a paging synchronization device according to an example. The paging synchronization device is applied to a terminal, and is configured to perform the paging synchronization method shown in FIG. 6. As shown in FIG. 15, the paging synchronization device may include a reception module 151 and a first synchronization module 152.

The reception module 151 is configured to, when determining that a synchronous signal block (SSB) for synchronization of the terminal has not been received, receive a reference signal for paging synchronization which is configured by a base station for a PO to be transmitted to the terminal.

The first synchronization module 152 is configured to perform paging synchronization according to the reference signal.

From the above example, when it is determined that no SSB is received for synchronization of the terminal, the reference signal for paging synchronization configured by the base station for the PO to be transmitted to the terminal can be received, and the paging synchronization can be performed according to the reference signal used for paging synchronization. In this way, a higher paging reception performance of the terminal can be ensured, and the efficiency of paging synchronization can be improved.

In an example, on the basis of the device as shown in FIG. 15, the paging synchronization device may include a third determination module 161 and a fourth determination module 162.

The third determination module 161 is configured to determine one or more first reception positions for receiving an SSB in an SSB transmission cycle.

The fourth determination module 162 is configured to, if no SSB has been received at each of the first reception positions, determine that no SSB for synchronization of the terminal is received.

From the above example, after one or more first reception positions for receiving SSBs in an SSB transmission cycle are determined, only when no SSB is received at each first reception position, it is determined that no SSB for synchronization of the terminal is received. At this time, the terminal receives a reference signal for paging synchronization configured by the base station for the PO to be transmitted, and performs paging synchronization according to the reference signal for paging synchronization. In this way, the accuracy of reference signal reception can be improved.

Figure 16:
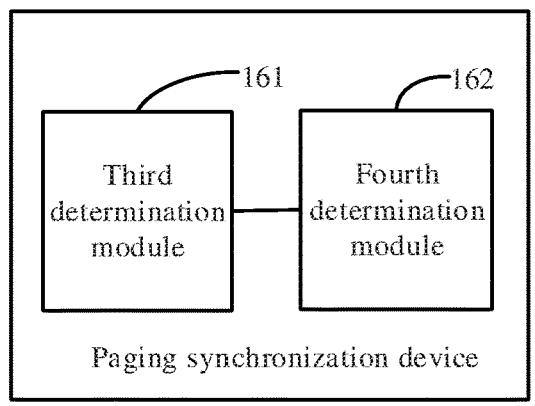
FIG. 16 is a block diagram illustrating another paging synchronization device according to an example.
Figure 17:
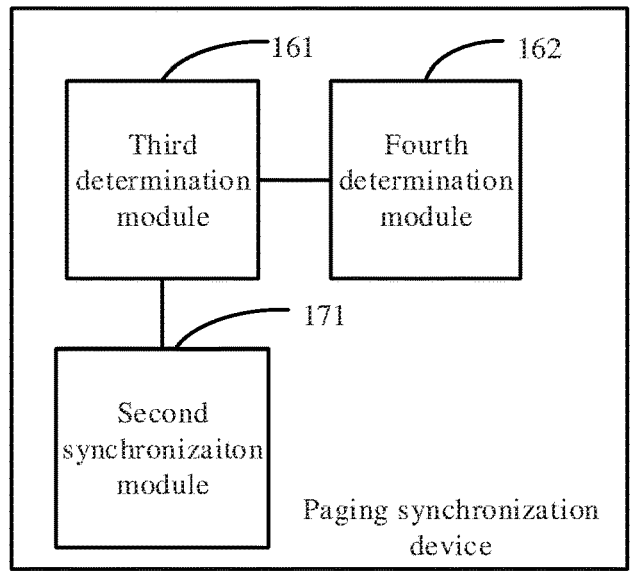
FIG. 17 is a block diagram illustrating a paging synchronization device according to an example.

In an example, on the basis of the device as shown in FIG. 16, the paging synchronization device may include a second synchronization module 171 as shown in FIG. 17.

The second synchronization module 171 is configured to, if an SSB is received at at least one of the first reception positions, perform paging synchronization according to the received SSB.

In an example, on the basis of the device as shown in FIG. 15, the reference signal is a pseudo-random sequence.

Figure 18:
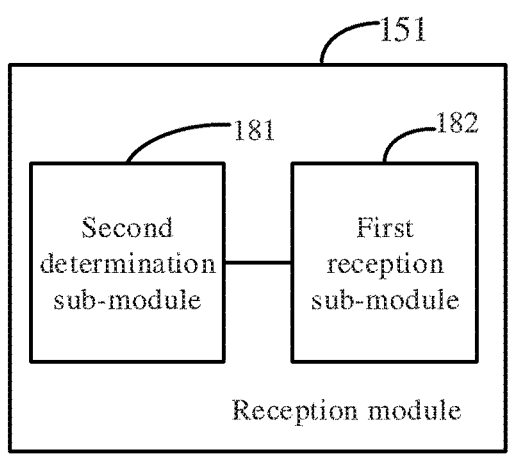
FIG. 18 is a block diagram illustrating another paging synchronization device according to an example.

In an example, on the basis of the device as shown in FIG. 15, the reception module 151 may include a second determination sub-module 181 and a first reception sub-module 182 as shown in FIG. 18.

The second determination sub-module 181 is configured to determine a pre-designated position for receiving the reference signal in the SSB transmission cycle.

The first reception sub-module 182 is configured to receive the reference signal at the pre-designated position.

From the above example, a pre-designated position for receiving a reference signal for paging synchronization in an SSB transmission cycle can be determined first, and the reference signal for paging synchronization is received at the pre-designated position, thereby improving the accuracy of reference signal reception.

Figure 19:
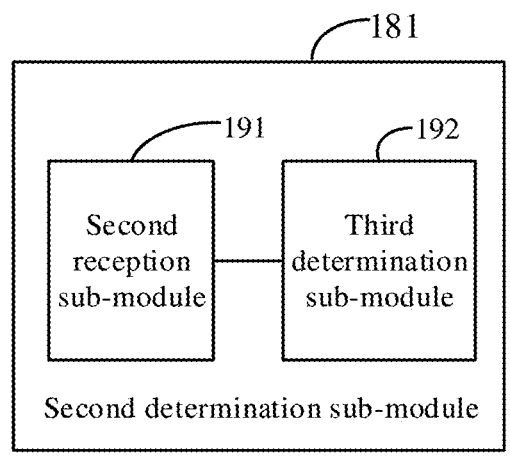
FIG. 19 is a block diagram illustrating another paging synchronization device according to an example.

In an example, on the basis of the device as shown in FIG. 18, the second determination sub-module 181 may include a second reception sub-module 191 and a third determination sub-module 192 as shown in FIG. 19.

The second reception sub-module 191 is configured to receive a paging synchronization signaling transmitted by the base station, wherein, the paging synchronization signaling comprises position information for indicating the pre-designated position.

The third determination sub-module 192 is configured to determine the pre-designated position based on the position information in the paging synchronization signaling.

From the above example, by receiving a paging synchronization signaling transmitted by the base station, where the paging synchronization signaling includes position information indicating a pre-designated position, and determining the pre-designated position based on the position information in the paging synchronization signaling, dynamic reception of the pre-designated position can be achieved, which improves the flexibility of the paging synchronization.

In an example, on the basis of the device as shown in FIG. 18 or 19, the pre-designated position is located before a second reception position for receiving the PO to be transmitted to the terminal, or located within a designated range of the second reception position.

For the device examples, since they basically correspond to the method examples, reference may be made to the partial description of the method examples. The device examples described above are merely illustrative, wherein the units described as separate components may or may not be physically separated, and the components displayed as units may or may not be physical units, i.e., may be located in one place or may be distributed to multiple network units. Some or all of the modules may be selected according to actual needs to achieve the objectives of the present disclosure. Those of ordinary skill in the art can understand and implement the present disclosure without any creative effort.

Corresponding, the present disclosure further provides a non-transitory computer readable storage medium having a computer program stored thereon, where the computer program is configured for executing a paging synchronization method according to any of FIGS. 1-5.

Corresponding, the present disclosure further provides a non-transitory computer readable storage medium having a computer program stored thereon, where the computer program is configured for executing a paging synchronization method according to any of FIGS. 6-9.

Corresponding, the present disclosure further provides a paging synchronization apparatus, applied to a base station and comprising:

a processor; a memory storing processor-executable instructions;

the processor is configured to perform a paging synchronization method according to any of FIGS. 1 to 5.

Figure 20:
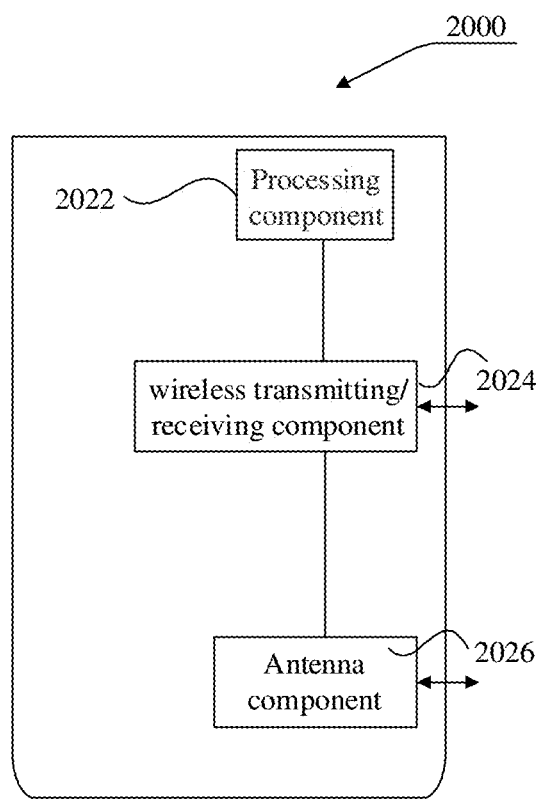
FIG. 20 is a schematic structural diagram illustrating a paging synchronization device according to an example.

As shown in FIG. 20, FIG. 20 is a schematic structural diagram illustrating a paging synchronization device according to an example. The device 2000 may be provided as a base station. Referring to FIG. 20, the device 2000 includes a processing component 2022, a wireless transmitting/receiving component 2024, an antenna component 2026, and a signal processing portion specific to a wireless interface. The processing component 2022 may further include one or more processors.

One processor in the processing component 2022 may be configured to perform the above-mentioned paging synchronization method.

Correspondingly, the present disclosure provides a paging synchronization device, which is applied to a terminal UE, and comprises:

a processor; a memory storing processor-executable instructions;

the processor is configured to perform a paging synchronization method according to any of FIGS. 6 to 9.

Figure 21:
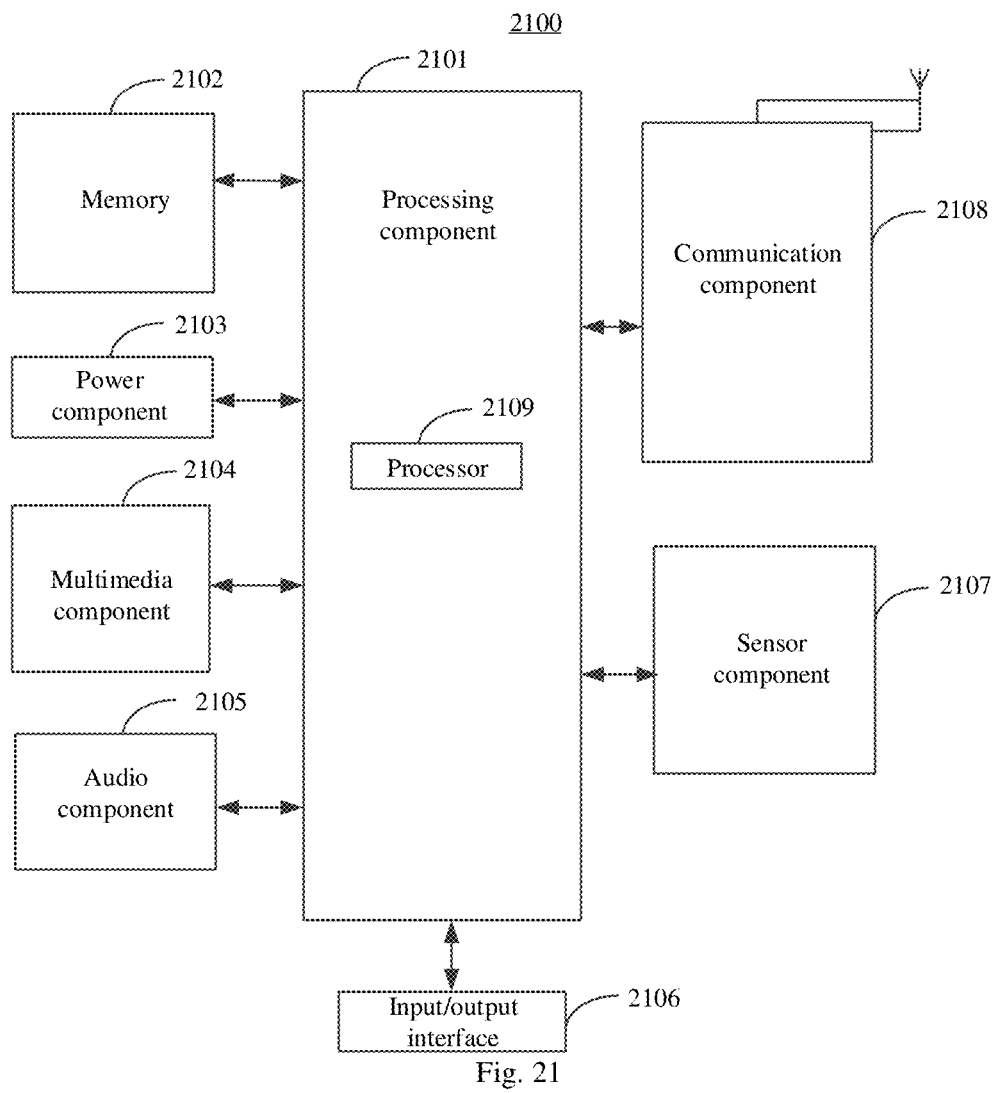
FIG. 21 is a schematic structural diagram illustrating a paging synchronization device according to an example.

FIG. 21 is a schematic structural diagram illustrating a paging synchronization device according to an example. As shown in FIG. 21, a paging synchronization device 2100 is shown according to an example. The device 2100 may be a computer, a mobile phone, a digital broadcast terminal, a messaging device, a game console, a tablet device, a medical equipment, a fitness equipment, a personal digital assistant, or other terminals.

Referring to FIG. 21, the apparatus 2100 may include one or more of the following components: a processing component 2101, a memory 2102, a power component 2103, a multimedia component 2104, an audio component 2105, an input/output (I/O) interface 2106, a sensor component 2107, and a communication component 2108.

The processing component 2101 usually controls the overall operation of the apparatus 2100, such as operations associated with display, telephone calls, data communications, camera operations, and recording operations. The processing component 2101 may include one or more processors 2109 to execute instructions to perform all or part of the steps in the methods described above. Moreover, the processing component 2101 may include one or more modules to facilitate interaction between the processing component 2101 and other components. For example, the processing component 2101 may include a multimedia module to facilitate interaction between the multimedia component 2104 and the processing component 2101.

The memory 2102 is configured to store various types of data to support operation at the apparatus 2100. Examples of these data include instructions for any application or method operating at the apparatus 2100, contact data, phone book data, messages, pictures, videos, and the like. The memory 2102 may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 2103 provides power to various components of the apparatus 2100. The power component 2103 may include a power management system, one or more power sources, and other components associated with power generated, managed, and distributed for the apparatus 2100.

The multimedia component 2104 includes a screen that provides an output interface between the apparatus 2100 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 2104 includes a front camera and/or a rear camera. When the apparatus 2100 is in an operation mode, such as a shooting mode or a video mode, the front camera and/or the rear camera may receive external multimedia data. Each of the front and rear cameras may be a fixed optical lens system or have a focal length and an optical zoom capability.

The audio component 2105 is configured to output and/or input audio signals. For example, the audio component 2105 includes a microphone (MIC) configured to receive an external audio signal when the apparatus 2100 is in an operation mode, such as a call mode, a recording mode, and a voice recognition mode. The received audio signal may be further stored in the memory 2102 or transmitted via the communication component 2608. In some examples, the audio component 2105 also includes a loudspeaker for outputting an audio signal.

The I/O interface 2106 provides an interface between the processing component 2101 and a peripheral interface module which may be a keyboard, a click wheel, a button, or the like. These buttons may include, but are not limited to a home button, a volume button, a start button, and a lock button.

The sensor component 2107 includes one or more sensors for providing a status assessment in various aspects to the apparatus 2100. For example, the sensor component 2107 may detect an open/closed state of the apparatus 2100, and the relative positioning of components, for example, the component is a display and a keypad of the apparatus 2100. The sensor component 2107 may also detect a change in position of the apparatus 2100 or a component of the apparatus 2100, the presence or absence of a user in contact with the apparatus 2100, the orientation or acceleration/deceleration of the apparatus 2100 and a change in temperature of the apparatus 2100. The sensor component 2107 may include a proximity sensor configured to detect the presence of nearby objects without any physical contact. The sensor component 2107 may also include a light sensor, such as a CMOS or CCD image sensor, for use in imaging applications. In some examples, the sensor component 2107 may also include an acceleration sensor, a gyro sensor, a magnetic sensor, a pressure sensor, or a temperature sensor.

The communication component 2108 is configured to facilitate wired or wireless communication between the apparatus 2100 and other devices. The apparatus 2100 may access a wireless network based on a communication standard, such as WiFi, 2G or 3G, or a combination thereof. In an example, the communication component 2108 receives broadcast signals or broadcast associated information from an external broadcast management system via a broadcast channel. In an example, the communication component 2108 also includes a near field communication (NFC) module to facilitate short range communication. For example, the NFC module may be implemented based on a radio frequency identification (RFID) technology, an infrared data association (IrDA) technology, an ultra wide band (UWB) technology, a Bluetooth (BT) technology, and other technologies.

In an example, the apparatus 2100 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing the above methods.

In an example, there is also provided a non-transitory computer readable storage medium including instructions, such as a memory 2102 including instructions, where the instructions are executable by the processor 2109 of the apparatus 2100 to perform the method as described above. For example, the non-transitory computer readable storage medium may be a ROM, a random access memory (RAM), a CD-ROM, a magnetic tape, a floppy disk, and an optical data storage device.

When the instructions in the storage medium are executed by the processor, the apparatus 2100 is configured for executing any of the above-described paging synchronization methods.

It is to be understood that the present disclosure is not limited to the precise structures that have described and shown in the drawings, and various modifications and changes can be made without departing from the scope thereof. The scope of the disclosure is to be limited only by the appended claims.

What is claimed is:

1. A paging synchronization method, applied to a base station, and comprising:
    in response to determining that transmission of a synchronous signal block (SSB) for synchronization of a terminal is disabled, configuring a reference signal for paging synchronization for a paging occasion (PO) to be transmitted to the terminal; and
    transmitting the reference signal to the terminal, to cause the terminal to perform paging synchronization based on the reference signal;
    wherein transmitting the reference signal to the terminal further comprises:
        determining a pre-designated position for transmitting the reference signal in an SSB transmission cycle;
        transmitting the reference signal to the terminal at the pre-designated position, to cause the terminal to receive the reference signal at the pre-designated position;
        generating a paging synchronization signaling which comprises position information for indicating the pre-designated position; and
        transmitting the paging synchronization signaling comprising the position information to the terminal, to cause the terminal to determine the pre-designated position based on the position information in the paging synchronization signaling.

2. The paging synchronization method of claim 1, further comprising:
    determining one or more first transmission positions for transmitting an SSB in an SSB transmission cycle; and
    in response to determining that each of the first transmission positions does not meet an SSB transmission condition, determining that the transmission of the SSB for synchronization of the terminal is disabled.

3. The paging synchronization method of claim 2, further comprising:
    in response to determining that at least one of the first transmission position meets the SSB transmission condition, transmitting the SSB for synchronization of the terminal at the first transmission position which meets the SSB transmission condition.

4. The paging synchronization method of claim 2, wherein the SSB transmission condition comprises:
    detecting that a channel is not occupied before the SSB is transmitted.

5. The paging synchronization method of claim 1, wherein the reference signal is a pseudo-random sequence.

6. The paging synchronization method of claim 1, wherein the pre-designated position is located before a second transmission position for transmitting the PO to be transmitted to the terminal, or located within a designated range of the second transmission position.

7. A paging synchronization method, applied to a terminal and comprising:
    in response to determining that a synchronous signal block (SSB) for synchronization of the terminal has not been received, receiving a reference signal for paging synchronization which is configured by a base station for a paging occasion (PO) to be transmitted to the terminal; and
    performing paging synchronization according to the reference signal;
    wherein receiving the reference signal for paging synchronization which is configured by the base station for the PO to be transmitted further comprises:
        determining a pre-designated position for receiving the reference signal in an SSB transmission cycle; and
        receiving the reference signal at the pre-designated position;
        wherein determining the pre-designated position for receiving the reference signal in the SSB transmission cycle further comprises:
            receiving a paging synchronization signaling transmitted by the base station, wherein the paging synchronization signaling comprises position information for indicating the pre-designated position; and
            determining the pre-designated position based on the position information in the paging synchronization signaling.

8. The paging synchronization method according to claim 7, further comprising:
    determining one or more first reception positions for receiving an SSB in an SSB transmission cycle; and
    in response to that no SSB has been received at each of the first reception positions, determining that no SSB for synchronization of the terminal is received.

9. The paging synchronization method of claim 8, further comprising:
    in response to that an SSB is received at least one of the first reception positions, performing paging synchronization according to the received SSB.

10. The paging synchronization method of claim 7, wherein the reference signal is a pseudo-random sequence.

11. The paging synchronization method of claim 7, wherein the pre-designated position is located before a second reception position for receiving the PO to be transmitted to the terminal, or located within a designated range of the second reception position.

12. A base station, comprising:
    a processor;
    a memory storing processor-executable instructions;
    wherein the processor is configured to:
    in response to determining that transmission of a synchronous signal block (SSB) for synchronization of a terminal is disabled, configure a reference signal for paging synchronization for a paging occasion (PO) to be transmitted to the terminal; and
    transmit the reference signal to the terminal, to cause the terminal to perform paging synchronization based on the reference signal;
    wherein in transmitting the reference signal to the terminal, the processor is further configured to:
        determine a pre-designated position for transmitting the reference signal in an SSB transmission cycle;

transmit the reference signal to the terminal at the pre-designated position, to cause the terminal to receive the reference signal at the pre-designated position;

generate a paging synchronization signaling which comprises position information for indicating the pre-designated position; and transmit the paging synchronization signaling comprising the position information to the terminal, to cause the terminal to determine the pre-designated position based on the position information in the paging synchronization signaling.

13. The base station of claim 12, wherein the processor is further configured to:

determine one or more first transmission positions for transmitting an SSB in an SSB transmission cycle; and in response to determining that each of the first transmission positions does not meet an SSB transmission condition, determine that the transmission of the SSB for synchronization of the terminal is disabled.

14. The base station of claim 13, wherein the processor is further configured to:

in response to determining that at least one of the first transmission positions meets the SSB transmission condition, transmit the SSB for synchronization of the terminal at the first transmission position which meets the SSB transmission condition.

15. The base station of claim 13, wherein the SSB transmission condition comprises:

detecting that a channel is not occupied before the SSB is transmitted.

\* \* \* \* \*

UNITED STATES PATENT AND TRADEMARK OFFICE
CERTIFICATE OF CORRECTION

PATENT NO. : 11,382,055 B2
APPLICATION NO. : 17/049840
DATED : July 5, 2022
INVENTOR(S) : Yang Liu It is certified that error appears in the above-identified patent and that said Letters Patent is hereby corrected as shown below:

On the Title Page

Item (87), Line 2, "PCT Pub. Date: Oct. 14, 2019" should read --PCT Pub. Date: Nov. 14, 2019--.

Signed and Sealed this
Eighteenth Day of October, 2022

Katherine Kelly Vidal
*Director of the United States Patent and Trademark Office*